(12) United States Patent
Erkin

(10) Patent No.: US 12,705,578 B1
(45) Date of Patent: Aug. 11, 2026

(54) SYSTEM AND METHOD FOR SCALABLE COLLABORATIVE DOCUMENT CREATION AND MONITORING

(71) Applicant: HYRDING LLC, Wayne, PA (US)

(72) Inventor: Dmitry Erkin, Needham, MA (US)

(73) Assignee: HYDRING LLC, Wayne, PA (US)

( * ) Notice: Subject to any disclaimer, the term of this patent is extended or adjusted under 35 U.S.C. 154(b) by 79 days.

(21) Appl. No.: 18/745,535

(22) Filed: Jun. 17, 2024

Related U.S. Application Data

(60) Provisional application No. 63/508,375, filed on Jun. 15, 2023.

(51) Int. Cl.
*G06Q 10/101* (2023.01)
*G06F 21/62* (2013.01)

(52) U.S. Cl.
CPC .......... *G06Q 10/101* (2013.01); *G06F 21/62* (2013.01); *G06F 2221/2141* (2013.01)

(58) Field of Classification Search
CPC .................. G06Q 10/101; G06F 21/62; G06F 2221/2141
See application file for complete search history.

(56) References Cited

U.S. PATENT DOCUMENTS

2007/0136662 A1* 6/2007 Khaba .................. G06F 40/166 715/202
2011/0209052 A1* 8/2011 Parker .................. G06F 3/0483 715/255
2012/0284634 A1* 11/2012 Sitrick ................ G06Q 10/101 715/751

(Continued)

OTHER PUBLICATIONS

Calvo, R. A., O'Rourke, S. T., Jones, J., Yacef, K., & Reimann, P. (2010). Collaborative writing support tools on the cloud. IEEE Transactions on Learning Technologies, 4(1), 88-97. (Year: 2010).*

(Continued)

*Primary Examiner* — John S. Wasaff

(74) *Attorney, Agent, or Firm* — Morgan, Lewis & Bockius LLP

(57) ABSTRACT

A method of collaboration includes creating an electronic document file representing a document, file having a plurality of sections denoted by table of contents metadata and using the table of contents metadata; identifying a plurality of document sections, receiving user input reflecting a preference for division of the plurality of document sections into separate section files and dividing the electronic document file into a plurality of separate section files; in response to user input indicating a first access control preference, providing access to a first of the plurality of separate section files to a first user; in response to user input indicating a second access control preference, providing access to a second of the plurality of separate section files to a second user; storing edits made by the first user to the first of the plurality of separate section files, in the first of the plurality of separate section files; storing edits made by the second user to the second of the plurality of separate section files, in the second of the plurality of separate section files and, automatically, at a predetermined time interval, merging the updated plurality of separate section files into an updated electronic document file.

16 Claims, 12 Drawing Sheets

(56) References Cited

U.S. PATENT DOCUMENTS

| | | | | |
|---|---|---|---|---|
| 2016/0119388 | A1* | 4/2016 | Sitrick | G06F 3/0484 715/753 |
| 2019/0005011 | A9* | 1/2019 | Sitrick | H04L 51/04 |
| 2019/0124150 | A1* | 4/2019 | Nelson | H04L 65/403 |
| 2019/0325012 | A1* | 10/2019 | Delaney | G06Q 10/101 |
| 2020/0065509 | A1* | 2/2020 | Ojha | G06F 21/6218 |
| 2020/0201823 | A1* | 6/2020 | Meschkat | G06F 16/176 |

OTHER PUBLICATIONS

Ouf, S., Nasr, M., & Helmy, Y. (Dec. 2010). An enhanced e-learning ecosystem based on an integration between cloud computing and Web2. 0. In The 10th IEEE International Symposium on Signal Processing and Information Technology (pp. 48-55). IEEE. (Year: 2010).*

* cited by examiner

Figure 1A:
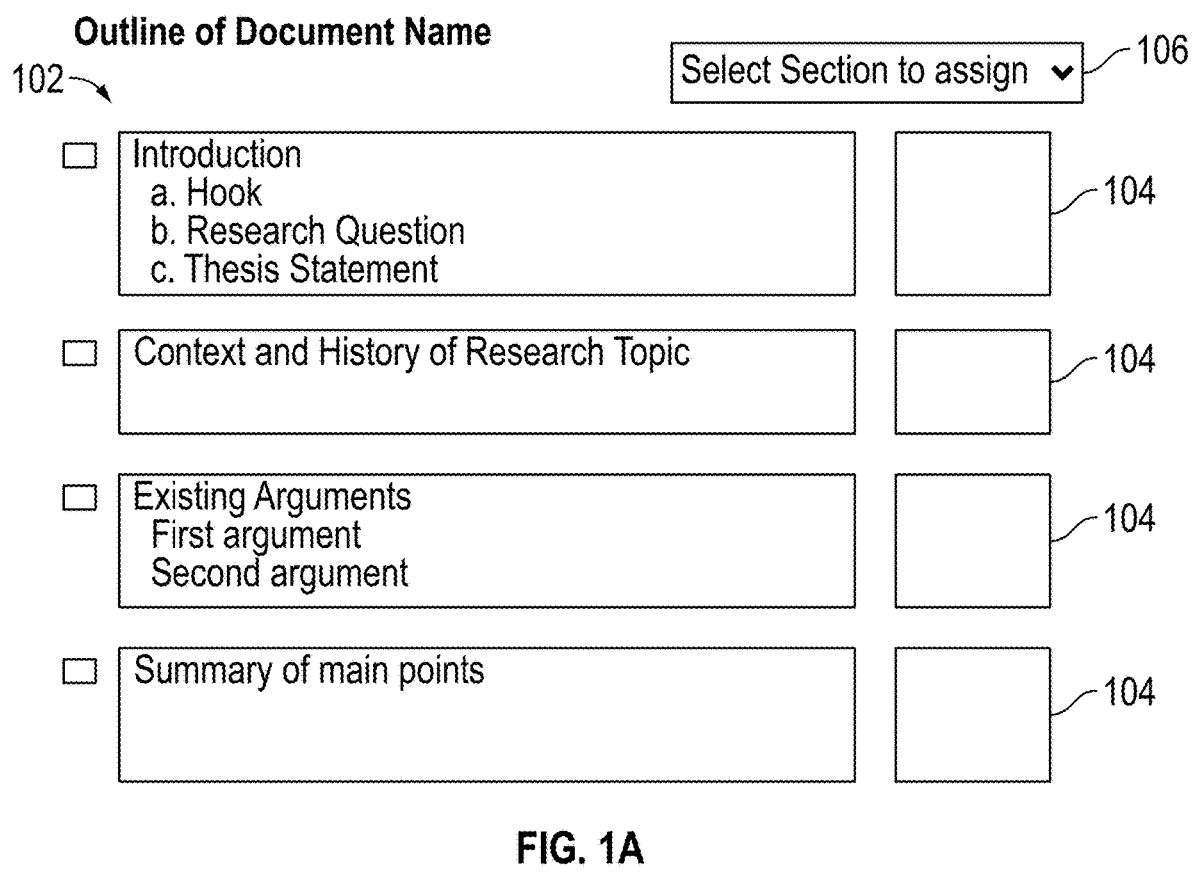

Outline of Document Name

102

Select Section to assign

106

Introduction
a. Hook
b. Research Question
c. Thesis Statement

104

Context and History of Research Topic

104

Existing Arguments
First argument
Second argument

104

Summary of main points

Figure 1C:
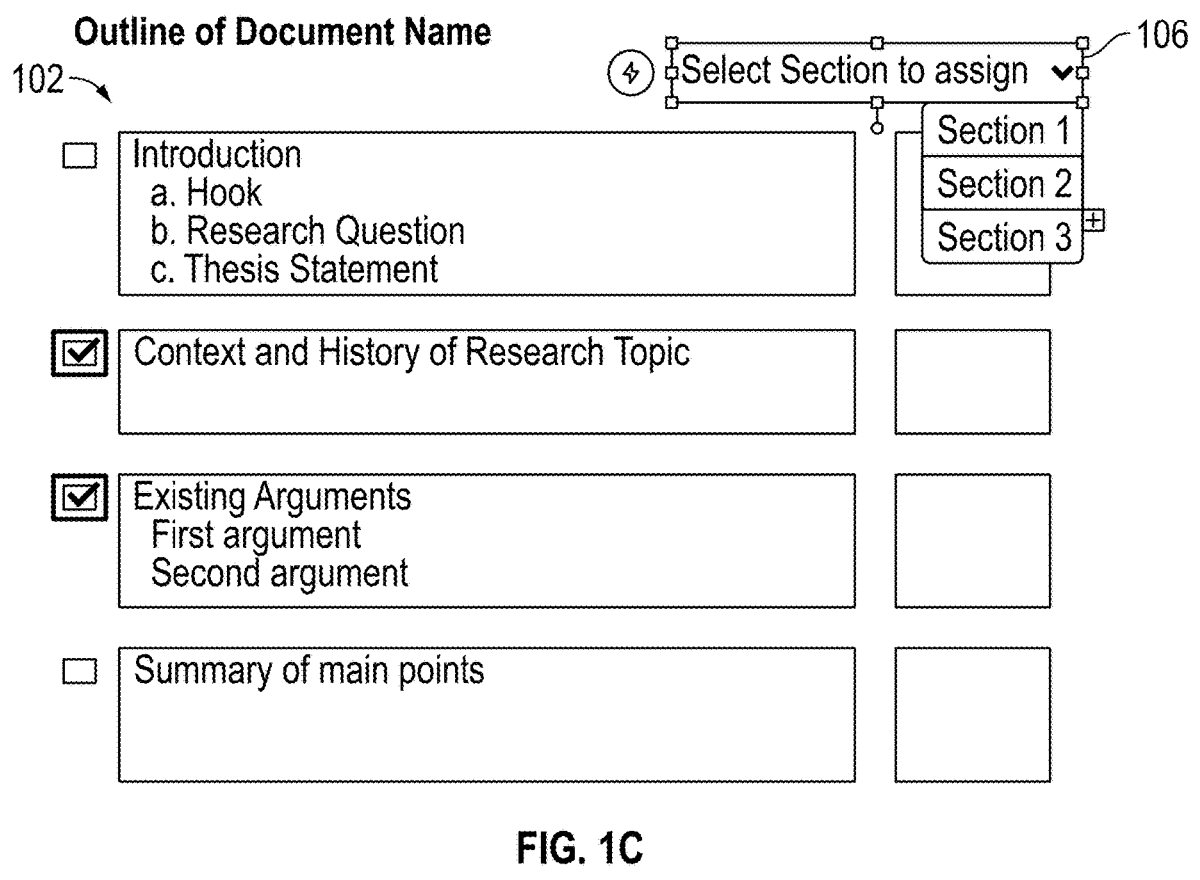

Outline of Document Name

102

106

Select Section to assign

Section 1
Section 2
Section 3

Introduction
a. Hook
b. Research Question
c. Thesis Statement

Context and History of Research Topic

Existing Arguments
First argument
Second argument

Summary of main points

Librarian
Documents > User 1
+New ⊞Edit in grid view Open Share Copy link Delete Pin to top Download ··· All Documents
202

| | | | |
|---|---|---|---|
| 0 Header.docx | May 27 | User 2 | 23.1 KB |
| 2 Study Objectives, Endpoints and... | May 4 | User 1 | 40.5 KB |
| 3 Investigational Plan.docx | May 16 | User 1 | 31.3 KB |
| 4 Study Participants.docx | May 16 | User 1 | 31.3 KB |
| HST-1011 Phase 1 Protocol Clin-0... ··· | May 4 | User 1 | 4.26 MB |

214

204
Manage File Tags
Search...
Key Value
Products × Existing tag...
216
Existing key... +

FIG. 2B

Figure 3A:
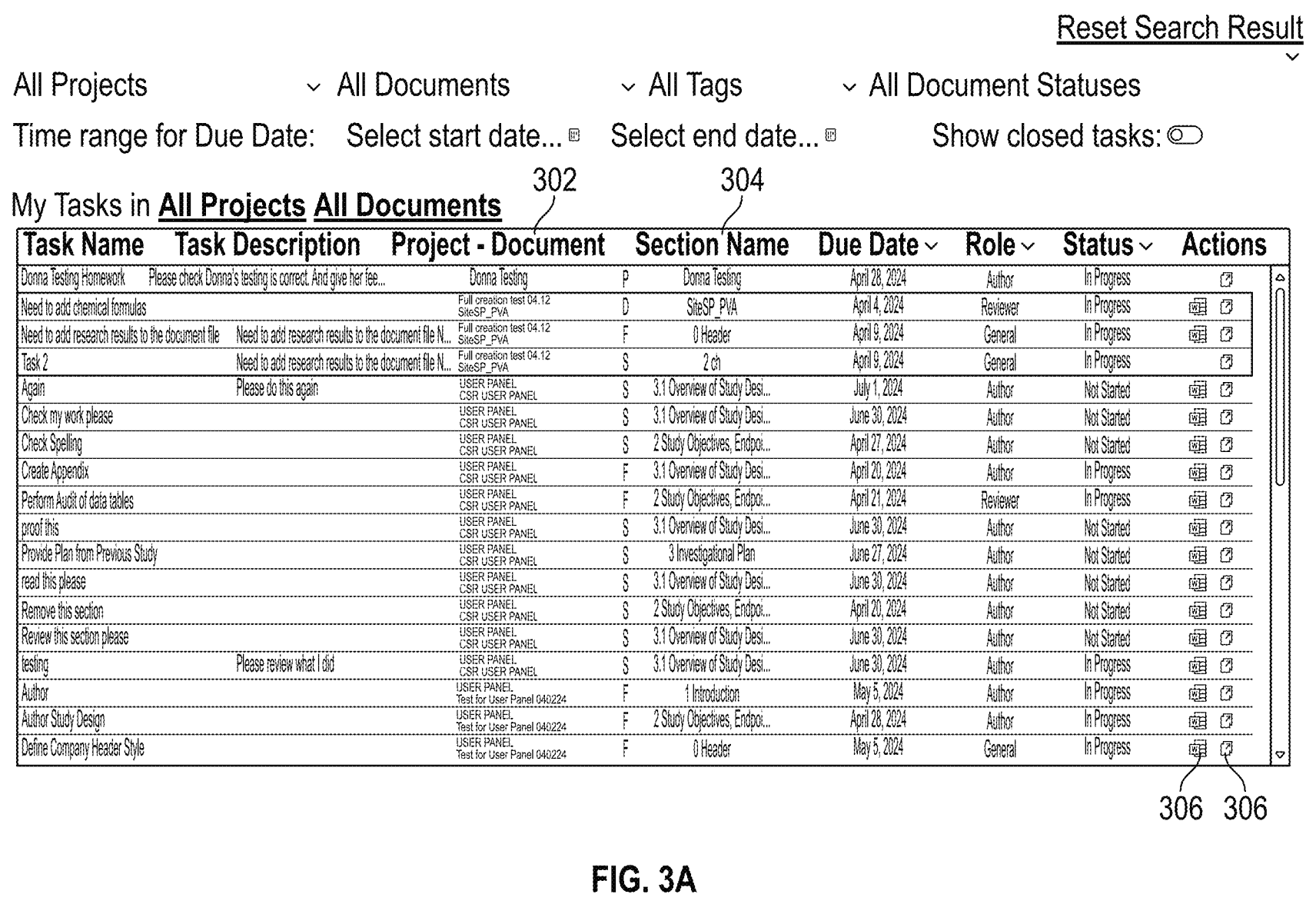

Reset Search Result

All Projects ⌄ All Documents ⌄ All Tags ⌄ All Document Statuses

Time range for Due Date: Select start date... Select end date... Show closed tasks:

My Tasks in All Projects All Documents

302 304

| Task Name | Task Description | Project - Document | Section Name | Due Date ⌄ | Role ⌄ | Status ⌄ | Actions |
|---|---|---|---|---|---|---|---|
| Donna Testing Homework | Please check Donna's testing is correct. And give her fee... | Donna Testing | P Donna Testing | April 28, 2024 | Author | In Progress | |
| Need to add chemical formulas | | Full creation test 04.12 SiteSP_PVA | D SiteSP_PVA | April 4, 2024 | Reviewer | In Progress | |
| Need to add research results to the document file | Need to add research results to the document file N... | Full creation test 04.12 SiteSP_PVA | F 0 Header | April 9, 2024 | General | In Progress | |
| Task 2 | Need to add research results to the document file N... | Full creation test 04.12 SiteSP_PVA | S 2 ch | April 9, 2024 | General | In Progress | |
| Again | Please do this again | USER PANEL CSR USER PANEL | S 3.1 Overview of Study Desi... | July 1, 2024 | Author | Not Started | |
| Check my work please | | USER PANEL CSR USER PANEL | S 3.1 Overview of Study Desi... | June 30, 2024 | Author | Not Started | |
| Check Spelling | | USER PANEL CSR USER PANEL | S 2 Study Objectives, Endpoi... | April 27, 2024 | Author | Not Started | |
| Create Appendix | | USER PANEL CSR USER PANEL | F 3.1 Overview of Study Desi... | April 20, 2024 | Author | In Progress | |
| Perform Audit of data tables | | USER PANEL CSR USER PANEL | F 2 Study Objectives, Endpoi... | April 21, 2024 | Reviewer | In Progress | |
| proof this | | USER PANEL CSR USER PANEL | S 3.1 Overview of Study Desi... | June 30, 2024 | Author | Not Started | |
| Provide Plan from Previous Study | | USER PANEL CSR USER PANEL | S 3 Investigational Plan | June 27, 2024 | Author | Not Started | |
| read this please | | USER PANEL CSR USER PANEL | S 3.1 Overview of Study Desi... | June 30, 2024 | Author | Not Started | |
| Remove this section | | USER PANEL CSR USER PANEL | S 2 Study Objectives, Endpoi... | April 20, 2024 | Author | Not Started | |
| Review this section please | | USER PANEL CSR USER PANEL | S 3.1 Overview of Study Desi... | June 30, 2024 | Author | Not Started | |
| testing | Please review what I did | USER PANEL CSR USER PANEL | S 3.1 Overview of Study Desi... | June 30, 2024 | Author | In Progress | |
| Author | | USER PANEL Test for User Panel 040224 | F 1 Introduction | May 5, 2024 | Author | In Progress | |
| Author Study Design | | USER PANEL Test for User Panel 040224 | F 2 Study Objectives, Endpoi... | April 28, 2024 | Author | In Progress | |
| Define Company Header Style | | USER PANEL Test for User Panel 040224 | F 0 Header | May 5, 2024 | General | In Progress | |

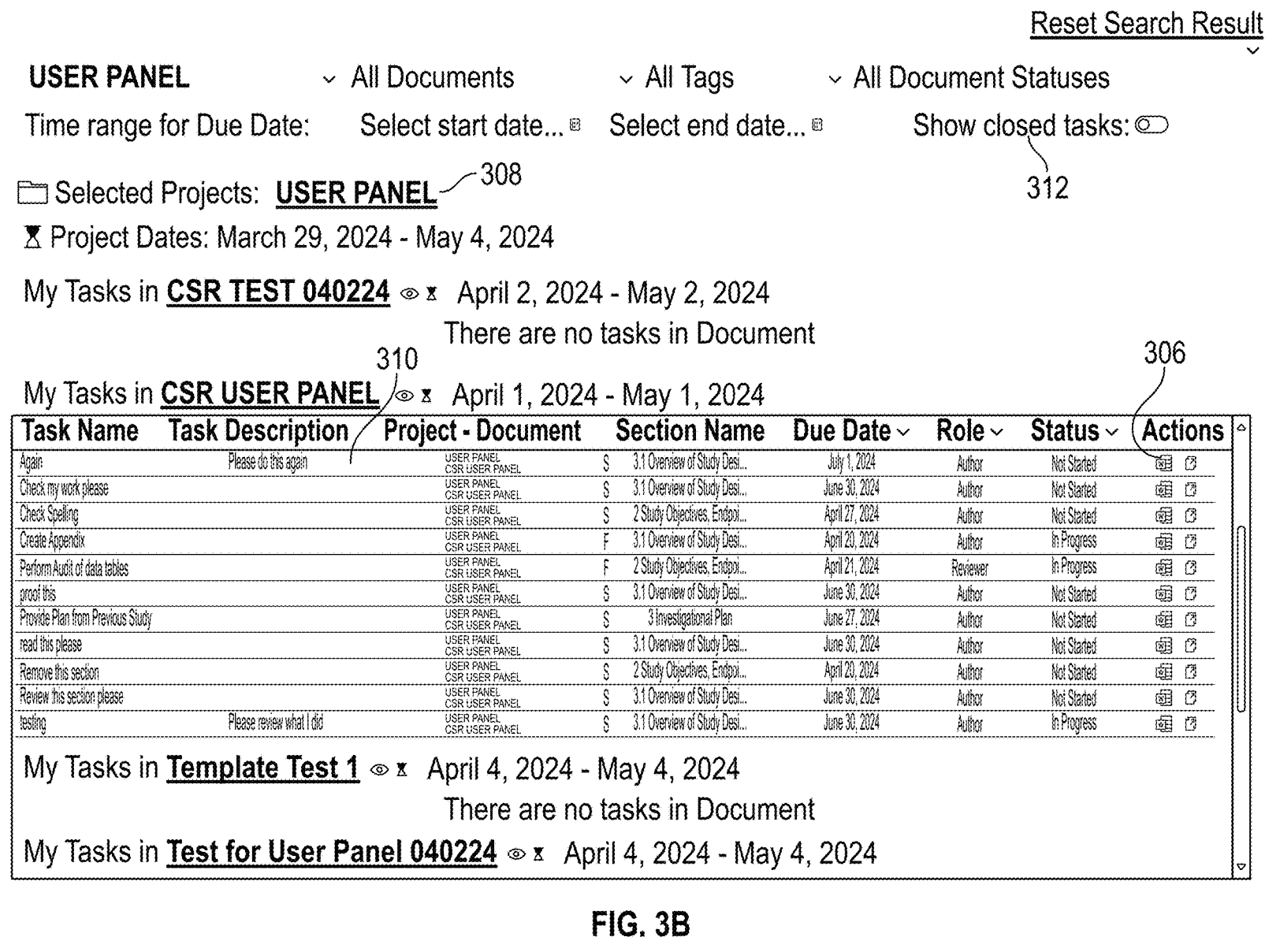

Reset Search Result

USER PANEL All Documents All Tags All Document Statuses

Time range for Due Date: Select start date... Select end date... Show closed tasks:

Selected Projects: USER PANEL

Project Dates: March 29, 2024 - May 4, 2024

My Tasks in CSR TEST 040224 April 2, 2024 - May 2, 2024

There are no tasks in Document

My Tasks in CSR USER PANEL April 1, 2024 - May 1, 2024

| Task Name | Task Description | Project - Document | | Section Name | Due Date | Role | Status | Actions |
|---|---|---|---|---|---|---|---|---|
| Again | Please do this again | USER PANEL CSR USER PANEL | S | 3.1 Overview of Study Desi... | July 1, 2024 | Author | Not Started | |
| Check my work please | | USER PANEL CSR USER PANEL | S | 3.1 Overview of Study Desi... | June 30, 2024 | Author | Not Started | |
| Check Spelling | | USER PANEL CSR USER PANEL | S | 2 Study Objectives, Endpoi... | April 27, 2024 | Author | Not Started | |
| Create Appendix | | USER PANEL CSR USER PANEL | F | 3.1 Overview of Study Desi... | April 20, 2024 | Author | In Progress | |
| Perform Audit of data tables | | USER PANEL CSR USER PANEL | F | 2 Study Objectives, Endpoi... | April 21, 2024 | Reviewer | In Progress | |
| proof this | | USER PANEL CSR USER PANEL | S | 3.1 Overview of Study Desi... | June 30, 2024 | Author | Not Started | |
| Provide Plan from Previous Study | | USER PANEL CSR USER PANEL | S | 3 Investigational Plan | June 27, 2024 | Author | Not Started | |
| read this please | | USER PANEL CSR USER PANEL | S | 3.1 Overview of Study Desi... | June 30, 2024 | Author | Not Started | |
| Remove this section | | USER PANEL CSR USER PANEL | S | 2 Study Objectives, Endpoi... | April 20, 2024 | Author | Not Started | |
| Review this section please | | USER PANEL CSR USER PANEL | S | 3.1 Overview of Study Desi... | June 30, 2024 | Author | Not Started | |
| testing | Please review what I did | USER PANEL CSR USER PANEL | S | 3.1 Overview of Study Desi... | June 30, 2024 | Author | In Progress | |

My Tasks in Template Test 1 April 4, 2024 - May 4, 2024

There are no tasks in Document

My Tasks in Test for User Panel 040224 April 4, 2024 - May 4, 2024

FIG. 3B

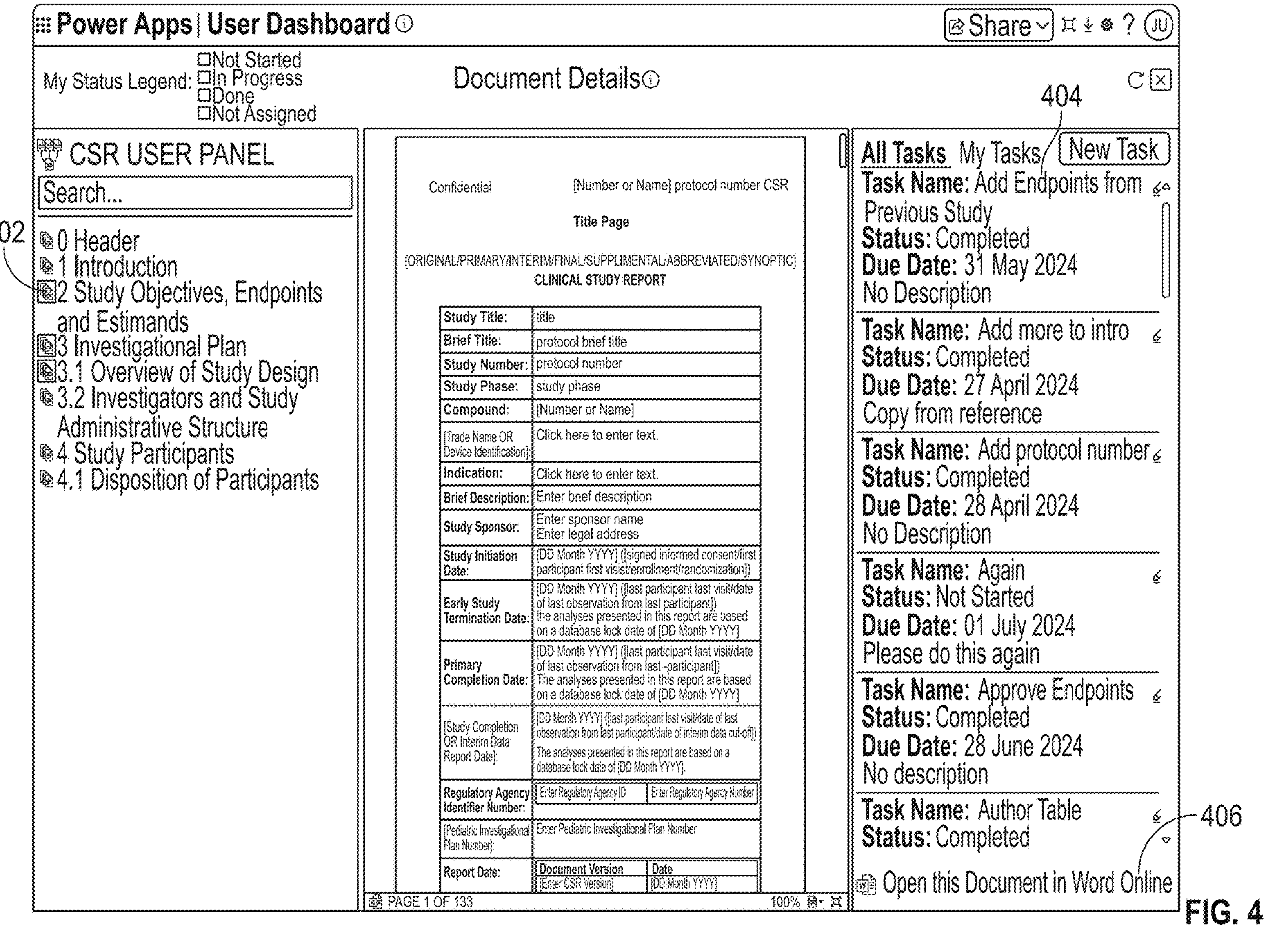
Power Apps | User Dashboard
Share
My Status Legend:
Not Started
In Progress
Done
Not Assigned
Document Details
CSR USER PANEL
Search...
0 Header
1 Introduction
2 Study Objectives, Endpoints and Estimands
3 Investigational Plan
3.1 Overview of Study Design
3.2 Investigators and Study Administrative Structure
4 Study Participants
4.1 Disposition of Participants
402
404
406
Confidential
[Number or Name] protocol number CSR
Title Page
[ORIGINAL/PRIMARY/INTERIM/FINAL/SUPPLIMENTAL/ABBREVIATED/SYNOPTIC]
CLINICAL STUDY REPORT
Study Title: title
Brief Title: protocol brief title
Study Number: protocol number
Study Phase: study phase
Compound: [Number or Name]
[Trade Name OR Device Identification]: Click here to enter text.
Indication: Click here to enter text.
Brief Description: Enter brief description
Study Sponsor: Enter sponsor name Enter legal address
Study Initiation Date:
Early Study Termination Date:
Primary Completion Date:
Regulatory Agency Identifier Number:
Report Date:
Document Version
Date
PAGE 1 OF 133
100%
All Tasks
My Tasks
New Task
Task Name: Add Endpoints from Previous Study
Status: Completed
Due Date: 31 May 2024
No Description
Task Name: Add more to intro
Status: Completed
Due Date: 27 April 2024
Copy from reference
Task Name: Add protocol number
Status: Completed
Due Date: 28 April 2024
No Description
Task Name: Again
Status: Not Started
Due Date: 01 July 2024
Please do this again
Task Name: Approve Endpoints
Status: Completed
Due Date: 28 June 2024
No description
Task Name: Author Table
Status: Completed
Open this Document in Word Online
FIG. 4

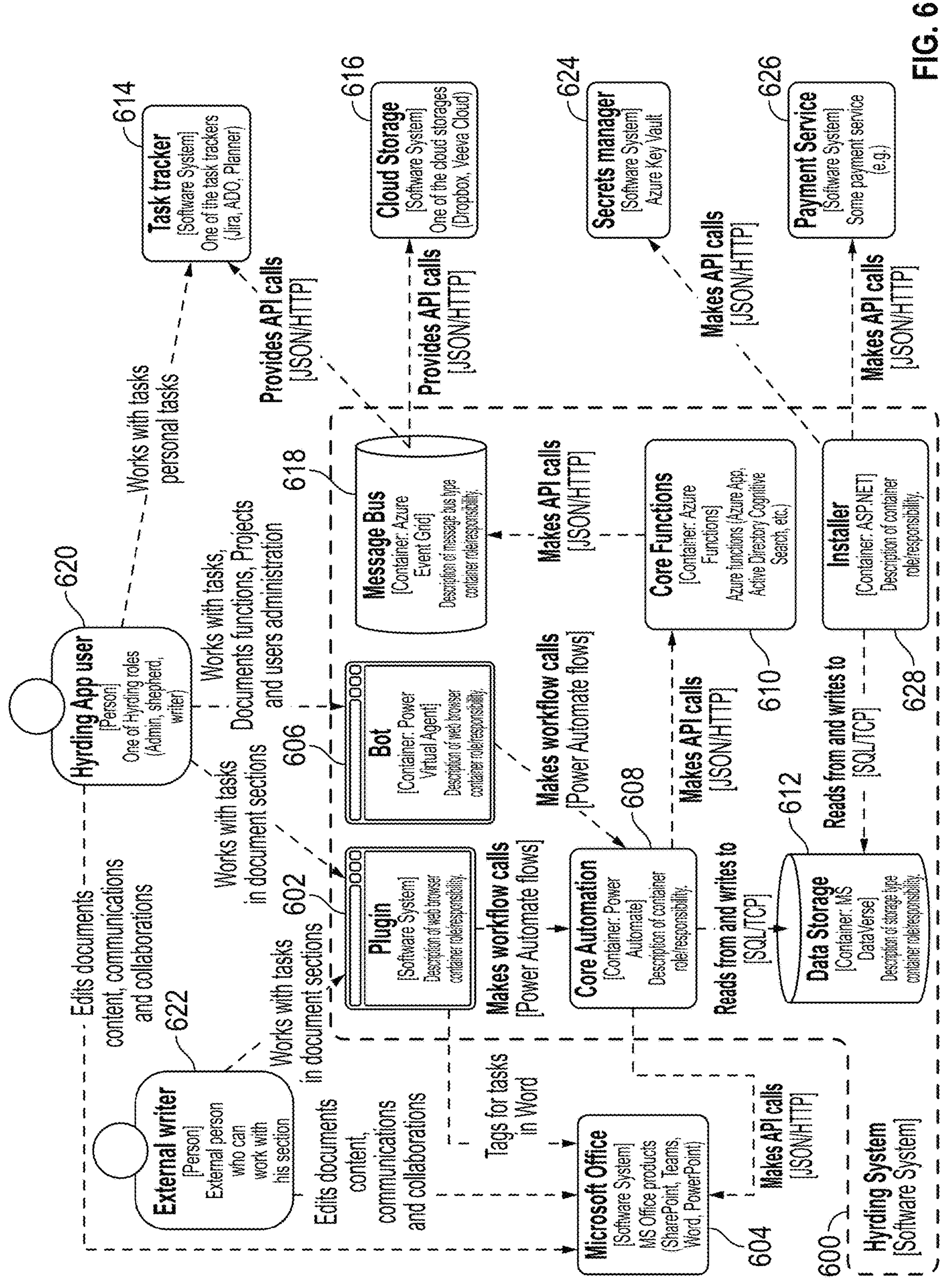
Hyrding App user
[Person]
One of Hyrding roles (Admin, shepherd, writer)
620
External writer
[Person]
External person who can work with his section
622
Task tracker
[Software System]
One of the task trackers (Jira, ADO, Planner)
614
Cloud Storage
[Software System]
One of the cloud storages (Dropbox, Veeva Cloud)
616
Secrets manager
[Software System]
Azure Key Vault
624
Payment Service
[Software System]
Some payment service (e.g.)
626
Works with tasks personal tasks
Works with tasks, Documents functions, Projects and users administration
Works with tasks in document sections
Edits documents content, communications and collaborations
Provides API calls
[JSON/HTTP]
Makes API calls
[JSON/HTTP]
Message Bus
[Container: Azure Event Grid]
Description of message bus type container role/responsibility.
618
Bot
[Container: Power Virtual Agent]
Description of web browser container role/responsibility.
606
Plugin
[Software System]
Description of web browser container role/responsibility.
602
Makes workflow calls
[Power Automate flows]
Core Automation
[Container: Power Automate]
Description of container role/responsibility.
608
Core Functions
[Container: Azure Functions]
Azure functions (Azure App, Active Directory Cognitive Search, etc.)
610
Installer
[Container: ASP.NET]
Description of container role/responsibility.
628
Reads from and writes to
[SQL/TCP]
Data Storage
[Container: MS DataVerse]
Description of storage type container role/responsibility.
612
Tags for tasks in Word
Microsoft Office
[Software System]
MS Office products (SharePoint, Teams, Word, PowerPoint)
604
Hyrding System
[Software System]
600
FIG. 6

SYSTEM AND METHOD FOR SCALABLE COLLABORATIVE DOCUMENT CREATION AND MONITORING

CROSS REFERENCE TO RELATED APPLICATIONS

This application claims the benefit of U.S. Provisional Application No. 63/508,375, entitled "System and Method for Scalable Collaborative Document Creation and Monitoring," filed Jun. 15, 2023, which is incorporated herein in its entirety.

TECHNICAL FIELD

The disclosed implementations relate generally to systems and methods for collaborative document creation, and more specifically to systems and methods to facilitate collaborative creation amongst diverse teams of collaborators.

BACKGROUND

Creation of large and complex documents in common word processing and presentation software is often done by large or small, multi-functional, and/or geographically dispersed teams working under time constraints. Errors and delays in writing, editing, and approving these documents costs time and money, so teams coordinate their work using project management tools and file sharing systems to allow many authors to work on a document concurrently.

One limitation of existing document and file management systems is that the smallest unit of control for access, editing privileges, and approval rights is at the full document level (e.g., editing privileges are applied to the document as a whole). This limitation makes it very difficult to manage the contributions of the various members of document creation teams. Difficulties arise in many aspects, including, but not limited to: 1) clarifying who is responsible for what contributions, 2) controlling versions of the collaborative document, 3) accessing and viewing in real time the contribution of others to assess overall progress, 4) preventing conflicting or unwanted overwritten content, and 5) coordinating approval and locking down (e.g., preventing unwanted changes) sections that are finalized earlier than others. For large documents, with large teams of people working on them, and with different sub-teams working on different sections, management, versioning, workflow, etc., at the full document level, becomes unwieldy.

Additionally, certain software tools, such as word processing applications, are ubiquitous. Because of their ubiquity, tools for collaboration, that would require teams to abandon familiar software applications, would fail to be adopted. It would be advantageous to allow collaboration tools to coexist with familiar software applications.

Another limitation is that several software tools besides word processing and presentation software are used in the process of collaboratively editing while updating and tracking workflow management. It is cumbersome for users to move between different software tools to accomplish their work. For example, when authoring, reviewing or approving a document, a user may, while in a document, raise a question to their team or ask for input from another team member while in the document. Heretofore, either a communication channel or planning tool for tasks were used to communicate with other team members, requiring the user to leave the document and make the communication.

Furthermore, it may be desired to copy and paste text from reference documents, which may be either in the archive or from elsewhere including on the internet. In such an instance, a user would need to leave the current document, find and open the other document, copy the relevant text and then paste it into the current document. Finally, a user may wish to compare text between the current document and a reference document. To do this the user would run comparison software and receive a summary of the differences, then go back to the current document to make any necessary changes. Finally, there are other applications such as those that make references from published literature used in the current document or software used to publish a file for regulatory submission that are separate tools which cannot be accessed from within the current document.

However, development controls are needed, especially for documents being generated by large teams, and sub-teams thereof. It is one advantage of the presently disclosed system to create, assign, and track tasks, and make the tasks visible to those performing them and those who assign them and monitor their progress. It is also advantageous to have tasks associated with the correct portion of the document in which they apply.

SUMMARY

In accordance with one or more embodiments of the present disclosure, a method of collaboration is herein disclosed. The method includes creating an electronic document file representing a document, the electronic document file having a plurality of sections denoted by table of contents metadata and using the table of contents metadata, identifying a plurality of document sections. The method further includes receiving user input reflecting a preference for division of the plurality of document sections into separate section files and dividing the electronic document file into a plurality of separate section files. The method further includes, in response to user input indicating a first access control preference, providing access to a first of the plurality of separate section files to a first user.

The method further includes, in response to user input indicating a second access control preference, providing access to a second of the plurality of separate section files to a second user. The method further includes storing edits made by the first user to the first of the plurality of separate section files, in the first of the plurality of separate section files, storing edits made by the second user to the second of the plurality of separate section files, in the second of the plurality of separate section files and, automatically, at a predetermined time interval, merging the updated plurality of separate section files into an updated electronic document file.

In some embodiments, the method may also include, in response to user input, assigning a task to the first user relating to the first of the plurality of separate section files, storing a data structure indicating the task, using the data structure, displaying information relating to the task, in a document editing window where the first of the plurality of separate section files is open for editing, in response to user input, updating a field of the data structure, indicating a change to a status of the task. In some embodiments, the data structure is stored in the first of the plurality of separate section files. In some embodiments, the method may also include synchronizing the data structure with an external task management database, stored separately from the first of the plurality of separate section files.

In some embodiments, the task is associated with user selected text within the first of the plurality of separate section files. In some embodiments, the method may also include, in response to user input interacting with the displayed information relating to the task, via a client device, automatically changing a display of the window that includes the user selected text.

In some embodiments, a method for simultaneous collaboration on the preparation of a document is herein disclosed. The method includes, on a server system comprising at least one server, creating a plurality of channels each channel having a channel name, associating an independent word processing file with each channel, authorizing at least one user to contribute content to each independent word processing file, the content being stored in a central database, receiving channel content for each channel comprising content contributed by each authorized user from a client interface remote from the central database, and displaying on a user interface a continuous document comprising all of the channel content; wherein the display is organized based on channel name and channel content.

In some embodiments, the method may also include allowing an authorized user to edit an independent word processing file, automatically updating the continuous document in real time after the user edits the independent word processing file, formatting a table of contents based on the channel names; and linking elements of the table of contents to the continuous document.

In some embodiments of the present disclosure, a system for of collaboration is herein disclosed. The system includes comprising one or more processors configured to create an electronic document file representing a document, the electronic document file having a plurality of sections denoted by table of contents metadata. The one or more processors are further configured to, using the table of contents metadata, identify a plurality of document sections. The one or more processors are further configured to receive user input reflecting a preference for division of the plurality of document sections into separate section files. The one or more processors are further configured to divide the electronic document file into a plurality of separate section files. The one or more processors are further configured to, in response to user input indicating a first access control preference, provide access to a first of the plurality of separate section files to a first user. The one or more processors are further configured to, in response to user input indicating a second access control preference, provide access to a second of the plurality of separate section files to a second user. The one or more processors are further configured to store edits made by the first user to the first of the plurality of separate section files, in the first of the plurality of separate section files. The one or more processors are further configured to store edits made by the second user to the second of the plurality of separate section files, in the second of the plurality of separate section files. The one or more processors are further configured to automatically, at a predetermined time interval, merge the updated plurality of separate section files into an updated electronic document file.

In some embodiments, the one or more processors are further configured to, in response to user input, assign a task to the first user relating to the first of the plurality of separate section files, store a data structure indicating the task, using the data structure, display information relating to the task, in a document editing window where the first of the plurality of separate section files is open for editing, and, in response to user input, update a field of the data structure, indicating a change to a status of the task.

In some embodiments, the data structure is stored in the first of the plurality of separate section files. In some embodiments, the one or more processors are further configured to synchronize the data structure with an external task management database, stored separately from the first of the plurality of separate section files. In some embodiments, the task is associated with user selected text within the first of the plurality of separate section files. In some embodiments, the one or more processors are further configured to, in response to user input interacting with the displayed information relating to the task, via a client device, automatically change a display of the window that includes the user selected text.

In some embodiments of the present disclosure, a system for simultaneous collaboration on the preparation of a document is disclosed. The system comprises one or more processors configured to, on a server system comprising at least one server, create a plurality of channels each channel having a channel name; Associating an independent word processing file with each channel, authorize at least one user to contribute content to each independent word processing file, the content being stored in a central database, receive channel content for each channel comprising content contributed by each authorized user from a client interface remote from the central database; and display on a user interface a continuous document comprising all of the channel content; wherein the display is organized based on channel name and channel content.

In some embodiments, the one or more processors are further configured to, on the server system, allow an authorized user to edit an independent word processing file, automatically update the continuous document in real time after the user edits the independent word processing file, format a table of contents based on the channel names, and link elements of the table of contents to the continuous document.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 1A through 1E are user interface exemplars of a shepherd application in accordance with one aspect of the present disclosure.

FIGS. 2A and 2B are user interface exemplars of a library application in accordance with one aspect of the present disclosure.

FIGS. 3A and 3B are user interface exemplars of a user application in accordance with one aspect of the present disclosure.

FIG. 4 is a user interface exemplar of a user application in accordance with one aspect of the present disclosure.

FIG. 6 is a block diagram of a system in accordance with one aspect of the present disclosure.

DESCRIPTION OF IMPLEMENTATIONS

Figure 1B:
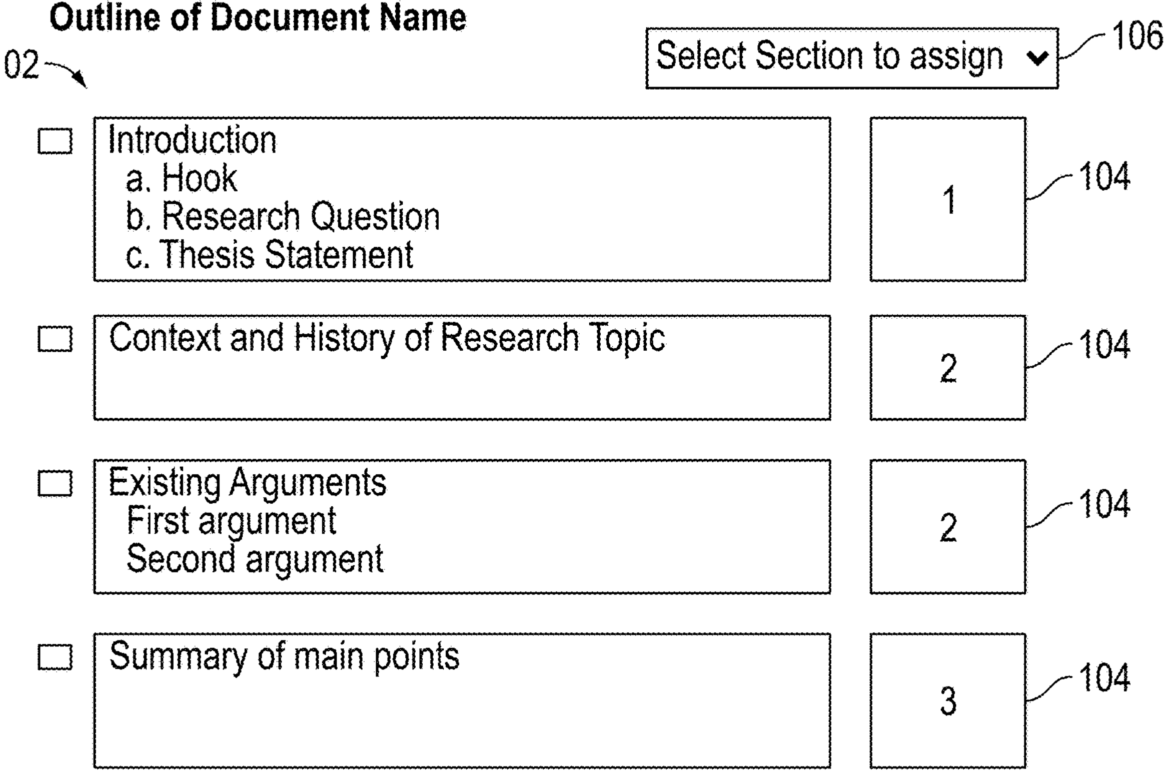

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting” or “in accordance with a determination that,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event]” or “in accordance with a determination that [a stated condition or event] is detected,” depending on the context.

In one embodiment, the system described herein includes one or more computing devices, having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

A system and method for collaboration on documents by large and disparate teams is herein disclosed. Some embodiments of the solution has three primary parts: a system and method for disassembling a document into constituent parts and re-assembling it back together, a workflow management system, and a word processor customization or “add-in,” for integration with the document while it is being edited. As stated generally, and as described in further detail below, the method begins with breaking the document into smaller parts to enable a finer control over its content and management. This allows different sub-teams to work on different sections of the document, without them having access to parts of the document that they should not be permitted to interact with or view.

In one aspect, every section identified for a particular document is associated with a selected channel. Each channel may be associated with a team that will be responsible for creating the content for the channel. By assigning a channel user authentication, a particular section of a document may be controlled for the channel. Thereby, only the people who are assigned to the channel have access to the channel. In one aspect, the channel accommodates an environment that includes visual elements that allow people to interact securely, based on the security definitions. The system may also be configured to provide a communication environment, which may allow, for example, a user to incorporate data through visual element that is visible only to other members of the channel.

Splitting the document into sections allows work to be coordinated with external users, such as contractors, vendors, etc., by allowing them to access only the parts of the document that are relevant to their work, while keeping the remained of the document secure. In some embodiments, the present system allows separate access to separate parts of a document without the transmission of a user-separated section of the document to another user. This avoids the need for a user to add the section back into the document once the user has completed his or her work on it. The present automated process results in error avoidance in the copying and pasting, and avoidance of losing track of most recent changes, etc.

By dividing the document in sections, sub-teams are assigned access only to the part of the document to which they should have.

In one embodiment, once a document is divided into parts, it is stored in a collaborative working environment. Microsoft Teams™ is one such collaborative working environment. Other collaborative working environments may also be used. In such a collaborative environment, for every section that has been identified, a separate channel may be created, to create a team assignment for the section, and a team assignment for the overall document. Separate channels within the team can be created for different sections of the document.

The second primary part of the presently disclosed system may include a workflow management system, such as the workflow management system described herein, is a class of products that allows a user to add, edit, delete, assign tasks. The system may include a task monitor, a task dashboard, lists, and the like. In one embodiment, the system provides a robust task management system that is document-centric and integratable with word processing applications such as Microsoft Word™.

In some embodiments, the collaboration environment allows users to be assigned to a channel, and the tool can be used to control access. This aspect allows for safe interaction based on security definitions and, allows for a communication environment that allows for the creation and sharing of files, tasks, team meetings, etc. amongst the users who are part of the editing team for that section of the document. This aspect also allows for independent environments to be created and used for each of the teams working on the specific section of the document.

In some embodiments, access control could also be managed in a shared database, such as SharePoint™, rather than a collaborative user environment, such as Microsoft Teams™. In such an embodiment, access to documents can still be managed, and access to different sections of documents may also be managed. In this embodiment, users who are assigned to work in this document receive a task directive.

Access control in some embodiments can be applied to both a shared database and collaborative user environment. For example, as part of a task directive, the user may also receive a link to the document that presents a specific section that the user is designated to work on. The user can click on the link and open the section. In some aspects, a user app is provided, where users can find or navigate to the documents to which they've been assigned, find the tasks to which they have been assigned to implement and conduct their work flow.

Aspects of the presently disclosed methods and systems permit editing and supervising users to create tasks that are both available in external task management systems and available, with document context, while editing the document in the word processing application. A task can be associated with a section or a segment of a section (e.g., a sentence in a document). In aspects of the system and method, the task is fully manageable by a workflow management system. In some aspects, that task includes a title, an assigned user, various status indicators and dates, and other fields and information that associate the task with the task management systems.

In some embodiments, the full task information may be persistently embedded in the document file, e.g., using the XML formatting of the document itself. Accordingly, because the task objects are in the document file itself, the file may leave the document management system and workflow management system, e.g., to be worked on by an external user without access to the rest of the system. When a document temporarily leaves the system, the tasks remain intact are able to be updated offline and then re-integrated into the system when the document is re-introduced to the system.

In some embodiments, the task that the user creates may be stored in a database, which may in some embodiments be stored in a database, (e.g., a Dataverse database, implemented under the Microsoft Power platform). Other database platforms and structures may also be used. Tasks stored in the task database may also be accessible, via synchronization, by other external workflow management systems of choice by an organization (e.g., Atlassian JIRA, Microsoft Planner To Do, and Microsoft Azure DevOps)

In one embodiment, a user creates a task associated with a document. Upon creation of the task, the task is stored (at least initially) in the task database and is also synchronized with the designated external workflow system. In some aspects, the task is then present and viewable, with synchronized up to date status information, in both the task database, the external workflow management system, and the document itself.

In some aspects, the system includes a task tracker. A task tracker may be used to synchronize with task tracking software, ensuring all task-related data is consistently updated and maintained across different platforms for seamless project management. In some aspects, bidirectional synchronization with task trackers may be included, to ensure that task statuses are consistently accurate across the system and external task management tools. In some aspects, a task tracker may be deployed to synchronize tasks, bidirectionally, between the task data contained in the documents themselves, the task data in the workflow management system, and other external task management databases or data stores. Examples of task tracking software include Jira, ADO, and Planner.

In some aspects, the workflow management system is configured to render at a display device one or more virtual dashboard for viewing the status of projects and/or tasks. Virtual dashboards may include views of the status of each project, the status of every task, the authors assigned to particular tasks. In some aspects, the workflow management systems have tools to create custom dashboards with monitoring and notification options. With task integration and synchronization between a task database, a document, and a workflow management system, users and administrators can use all of these tools and functionality automatically without the need for manual synchronization and dual entries. In some embodiments, tasks may be implemented as data structures that contain a plurality of task fields, which may be viewable and also may be customizable by a user. Customization of tasks may also include the creation of new fields.

The third feature of the present disclosure is integration with the word processing application, to reduce the need for users to go back and forth between applications and eliminate the need to leave the document to update things like tasks. This may be implemented as an add-in, e.g., to word processing applications such as Microsoft Word.

The word processing add-in provides an interface to interact with tasks, including an ability to create and manage tasks while viewing and interacting with the word processing document. The word processing add-in may also provide access to search results. Search results, from internal resources such as databases like Sharepoint, and from external sources such as the internet, may be access without leaving the document and may be more easily incorporated into the document. In some embodiments, an ontology of tags may be used in a database such as SharePoint, which may allow for easier location of relevant documents later, for reference, which search is performed by reference to the tags.

The word processing add-in may provide access to the archive and search utility of the archive. This may include a window, within the document view, which allows search results to be viewed and interacted with, further filtered, without leaving the document or the word processing application. Search results, including full text, may also be insertable into the document, from this search interface, without the necessity and complexity of manually copying and pasting. In other embodiments, manual copying and pasting may be used. In either instance, formatting and other issues may be handled by the add-in, to adapt the reference text to the formatting of the target document. Inserting references or citations to search results may also be included as a feature of the word processing add-in. In some embodiments, the search result may be pre-processed using generative AI to integrate found text into the document user is working on.

The word processing add-in may also include an artificial intelligence ("AI") bot. The AI bot may have different functionalities that are specifically designed to assist in document development. The AI bot may be able to modify reference text, e.g., from a search result, to better fit the subject matter of the document into which the reference text has been inserted.

Turning now to FIG. 1A through 1E, where a series of user interface examples are shown of a dashboard user interface, rendered by the system, to present an administrator interface, which may also be referred to as a shepherd application, in accordance with one embodiment of the present disclosure. A shepherd application may be used by the administrator of a document or a set of documents, in order to distribute work on documents and/or monitor the progress of work on documents. According to the present disclosure, a shepherd application is designed to be used by a user whose responsibility it is to monitor the progress of many documents each with multiple parts assigned to different workflow teams and to assign work in each document to those teams of other users.

In FIG. 1A, an outline 102 of a document is shown. Outline 102 shows sections of the document (e.g., Introduction, Context, Existing Arguments, Summary of main points), which may be created by the user via the shepherd application or may be derived from a shell of the document using table of contents data (e.g., that has been preformatted). A parser process, as also described below, may be used to present the initial view of the sections that may be available for separation.

In FIG. 1A, section markers 104 are blank. In FIG. 1B, section markers 104 contain an indicia (e.g., numerals) that are associated with the manner in which the user of the shepherd application has decided to divide the document. In this example, three (3) teams will be working on the document. The document is therefore divided into three (3) sections (e.g., corresponding to each team). The system outline has identified four (4) sections, denoted by the four (4) section markers 104. Via the shepherd app, the user is able to combine two (2) of the sections, as shown, by labeling the second and third identified sections with the number 2. Thus, while the outline has four (4) distinct topics, those topics are each assigned one (1) of three (3) available sections that correspond to the three (3) teams.

Figure 1D:
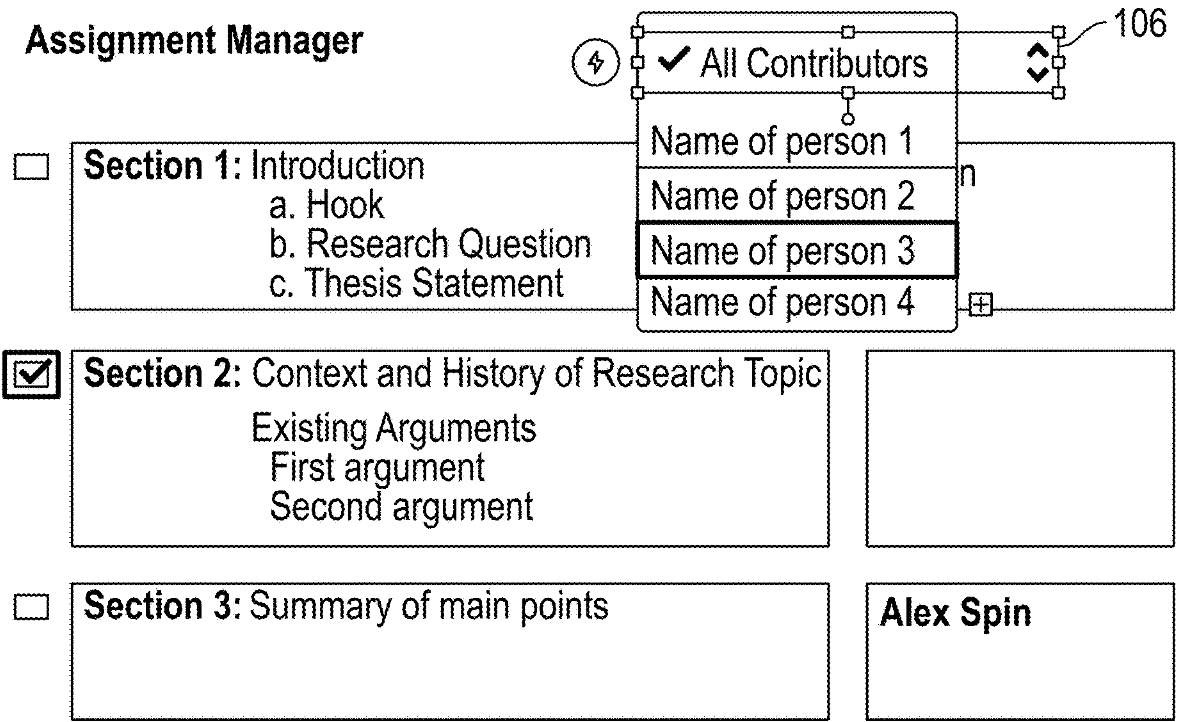
Figure 1E:
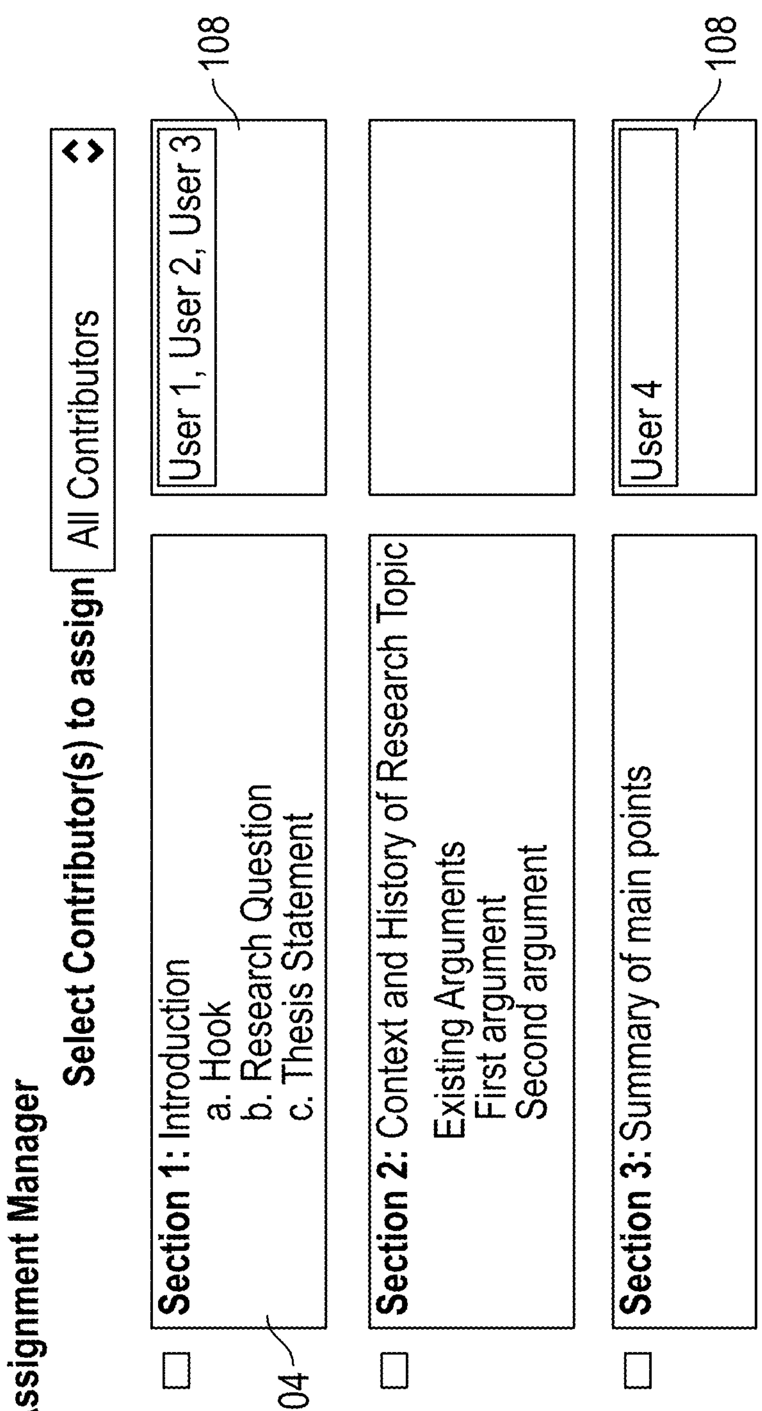

FIG. 1C shows a drop-down menu 106 for section assignment. In this view, the user can choose a section for assignment to one or more users, e.g., document writers and editors. In FIG. 1D, a section has been selected. A drop-down menu 106 now shows the names of team members, to whom the user of the shepherd application may assign the chosen section. Each section can be assigned to multiple people, who make up the team for that section. As shown in FIG. 1E, contributor listing 108 is shown, where the first and third sections are shown as having been assigned to teams of users. These assignments can be changed within the Shepherd application during the life of the document.

The shepherd application may also contain other shepherd dashboard user interfaces (not shown). The shepherd application may display a list of documents that a logged-in administrator user is handling. The shepherd application may also display status of tasks, and may accept user input for the display to be filtered, e.g., by which document they apply to, by which document editing user they apply to, what their status is (ongoing, complete, not begun), etc.

Once a shepherd application has obtained user input to denote the sections of the document, the system may then divide the document into those sections to be stored as separate files. In some embodiments, a cutter process may be invoked. A cutter process may remove or segregate the document into sections, as identified by the shepherd application user, using table of contents data within the document itself. A parser process may be used to determine the beginnings and ends of sections, and a cutter process may be used to separate the different sections, identified by the parser process, into separate files. The parser process may be incorporated into a split algorithm as discussed in more detail below.

As part of the parsing and cutting process, metadata, such as paragraph styles, may be copied from the document to each section, so they are kept consistent across different sections of the document even though the sections are stored as separate files. Some word processing file formats, including DOCX are implemented to include an XML file that has well defined metadata tags that describe, for example, style. The cutter process may copy these metadata tags to newly created section file. This allows the system to ensure consistent look and feel of the sections with respect to each other. As noted above, the use of separate files permits the shepherd or other administrators to restrict access to different sections of the same document, to different teams or team members. Document templates may also be used to maintain consistency of styles and other formatting metadata across a document.

During the process of document creation, an editor, a supervisor, or another user, with supervisory authority over the full document, may wish to view the document as a whole, to view the progress without having to navigate to each section. To facilitate review, the system may also re-merge the sections into the full document, on a periodic basis. The duration of the periodic basis may be configurable, e.g., by the user of the shepherd application. In some embodiments, the full document is reassembled every sixty (60) minutes. In some embodiments, the full document is reassembled on a user-selected fixed basis (e.g., every 10 minutes). Other durations may be used or available for use.

A process to merge all documents may be used. The merge-all-documents process may pass through the database and receive a list of all active documents. An active document may be a document that has been edited since the last time the merge all documents process was run. The merge process may then receive a list of all related files for each document. In one aspect, the merge process sends all of the collected files to a single document "word/merge" function. In one aspect, the single-document word/merge function operates on all of the collected files to create a single document. In some aspects, the word/merge function includes, for example, Microsoft Azure. In some embodiments, the single document word/merge function accessible through the shepherd app or other dashboards as appropriate, combines the document section files to create a new whole document file that replaces the whole document file that was created the last time the word/merge function was run on that document.

Tasks may be associated with the document, as part of the document format itself. Tasks may also be stored as entries in a Tasks table in a database such as a Microsoft Power Dataverse. A Dataverse may be used to store the metadata on projects and documents, and to keep track of tasks. In some aspects, task objects are stored in a database such as a Dataverse. In some embodiments, tasks may be created and/or updated across multiple UIs. In some embodiments, tasks may be integrated with external systems, e.g., Jira, ADO, Planner. In some embodiments, users may interact with tasks using the UI of the presently disclosed system, and/or users may also use native tools of the system with which the tasks are integrated. This versatility allows users to maintain all corporate workflow management in one platform, e.g., using high level dashboard with the tasks of the present system as part of it, while also allowing users to have a consistent and customizable interface. Versatility across task platforms may be enabled by keeping track of external task identifiers from an integrated system and associating it with the task in a task table of the presently disclosed system.

In some embodiments of a tasks system, a task may be an object or other data structure, which may include a plurality of fields. Fields in a task object may include a task status, a task name, one or more dates associated with updates to the task. Fields may also include a file, such as a document file, with which the task may be associated. Fields may also include a parent link. When creating a task for a document or a document section file, the "File" link field is filled in for the new task, where a unique identifier of the file entry is affixed. If a task is created for a section or a merged document, then the Parent link field is filled in with the unique identifier of the section or document record, respectively. Upon creation of a task, a bookmark may also be linked to a location, in the document, that was selected by the cursor, e.g., when the task was created. After creating a new task, a new bookmark with the globally unique identifier ("_guid") of the task may be created in the document file.

A parent field may be linked to the Project or Team, for the entire document, or to the channel for the document section. This link may occur through a polymorphic lookup. A task can be associated with any of a project a team, a channel, or a file. If a task is linked to a project, the parent field may be linked to a project table. If a task is linked to a merged document, the parent field may be linked to a team table. If a task is linked to a section, the parent field may be linked to a channel table. If a task is linked to a file, the parent field may be linked to the channel table and the file field may also be linked to the file table. The parent field specifies the section of the document to which the file belongs.

In one aspect, the documents created by an organization may be stored as part of a repository or archive of documents. Such an archive may be stored in a repository such as a SharePoint database, or in other storage that can be accessed by the organization. In some embodiments or use cases, such an archive of documents may become a resource for current document writers, who may wish to search for and review documents that have been deemed to touch on similar or related topics. One way of enhancing the search capability of an archive of documents may be through tagging. Using tagging, documents can be marked as relating to one or more frequently used topics. These tags may in some use cases be applied by a user such as a librarian, who may apply such tags in a library application.

Figure 2A:
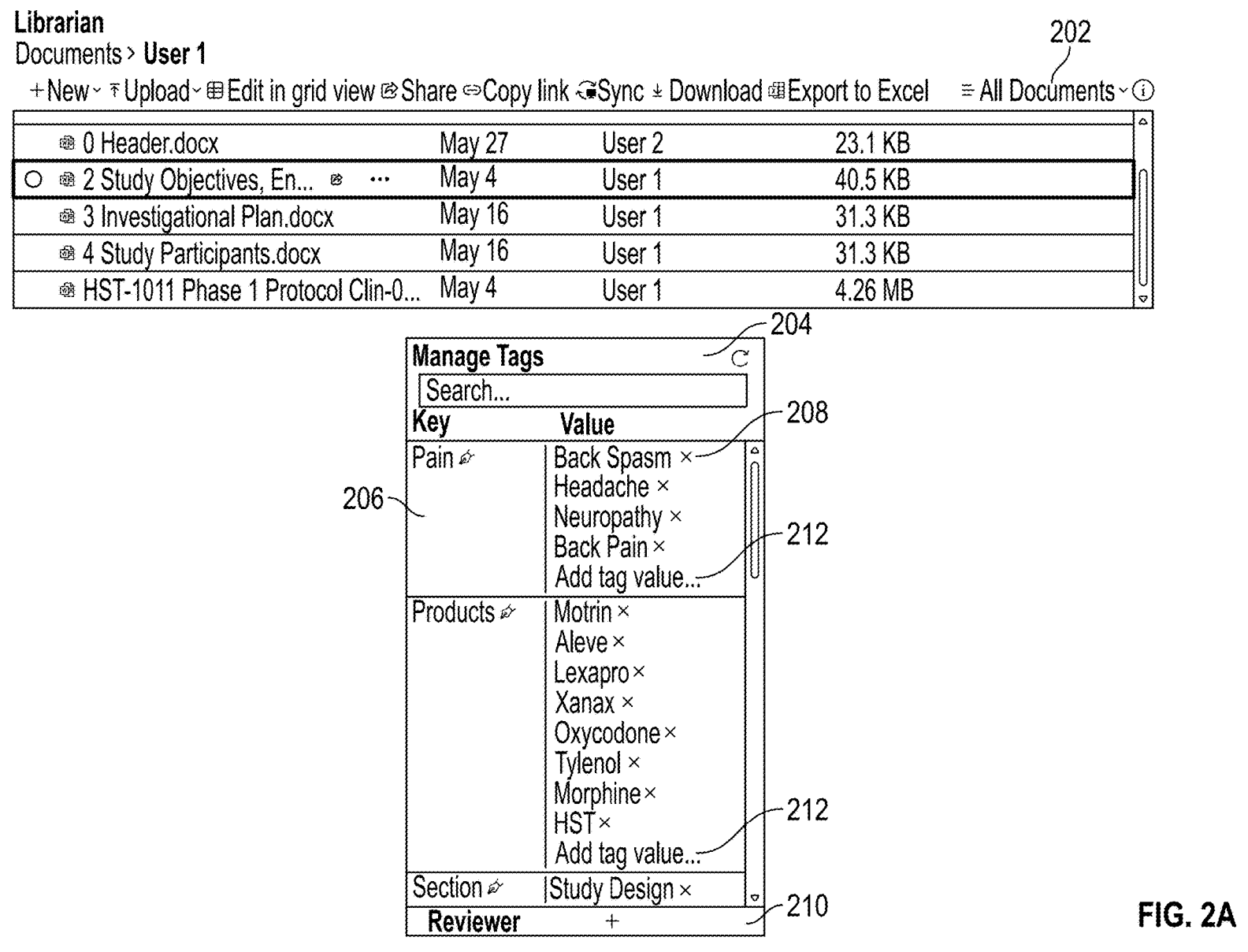

Turning now to FIG. 2A, where an exemplary user interface for a library application is shown. A library application may be used as part of the system, as presently disclosed, to manage the archive of previously created documents, and to allow the optimization of that archive for future searching. The library application may be configured to provide functionality to facilitate the maintenance of an ontology, which is a collection of metadata tags, also referred to as "tags" herein, that will be useful when searching through the archives of documents, when AI or advanced search capabilities are used for supporting the document authoring and review and approval process. The library application may be used for creating the ontology, which may be a universal ontology of tags used across the entire archive or database of documents. The ontology may be maintained by one or more library application users, who may create new tags as documents are created that deal with new topics not previously dealt with in documents in the document archive. The library application user may also apply existing tags, created previously, to a new document that deals with a previously discussed topic. In some embodiment, a tag may have both a key, which is a generalized topic, and a value, which is a more specific topic or a species of the key. For example, a tag may have a key of "medicine delivery mechanism" and a value of "pill" or "intravenous."

As shown in FIG. 2A, a filter interface element 202 shows that the displayed ontology applies to "All Documents." Manage tags interface 204 shows the ontology, which includes a column displaying keys 206 and a column displaying values 208. The library application may permit the addition of either keys, using key addition interface element 210, and/or values using value addition user interface element 212, to the ontology by a library application user. As more documents are added to the archive, there may be a need for more tags to enable more accurate searching.

In FIG. 2B, document selection user interface element 214 shows that the ontology displayed in manage tags interface 204, relates to a single selected document. Accordingly, via add-existing-tag user interface element 216, the library application user can add tags, that are in the company ontology, to this particular document so that the document may be located later when those ontology tags are searched.

Turning now to FIGS. 3A and 3B, where user interface exemplars of a user application are shown. A user application is where a user, has been assigned the role of writing or editing the document, would find the documents, sections, and tasks to which that user is assigned. In some embodiments, document files, and document section files, may be stored in a shared data center such as SharePoint, or in other kinds of storage, e.g., cloud storage. In some embodiments, tasks may be stored within the document files, and may also be stored in Turning now to FIG. 3A, a user interface, rendered on a networked device and including a display of a user's tasks. The view in FIG. 3A shows all of the user's tasks, unfiltered. The "project-document" column 302 shows the name of the project and the document to which the task belongs, while the "section name" column 304 shows the name of the section of that document, to which this team member is assigned and to which the task relates. The user application interface also shows task name, task description, due date, role, and status. The user application interface also has action buttons 306, which permit the user to launch the document in the chosen word processing software to which the task is related. If the task is associated with a particular section, paragraph, sentence, word, or other portion of the document, interaction with action buttons 306 may cause the document to open at the associated portion. The user interface, as shown in FIG. 3A, may also allow a user to update or modify the task, e.g., to reflect progress made, change a due date, add a responsible party, or edit other task metadata or fields.

As discussed above, in some embodiments, the tasks listed in the interface of FIG. 3A may be stored in the XML formatting of the document itself. As described herein, the word processing add in application may be configured to modify the files created by the work processing files, to save task objects in the XML code of that file. Saving the task objects in the file itself allows for more contextual awareness in the viewing of the tasks and allows the tasks to be portable with the document. Saving tasks in this way allows for seamless integration between the task and the document, which allows for document portability with tasks embedded therein. The document-embedded tasks may also be synchronized to task databases, such as in collaborative environments or workflow management environments.

Turning now to FIG. 3B, a list of tasks is shown, with the tasks filtered by project. A project may contain multiple documents, so it may be helpful to be able to filter tasks at both the project and the document level. As shown by user interface element 308, in this exemplar, only tasks associated with the project “USER PANEL” are shown. The project “USER PANEL” has two documents. In the document “CSR TEST 040224,” the user has no tasks. In the document “CSR USER PANEL,” the user has a list of tasks 310, which are shown including task name, task description, section name of the document, due date, user rule, and task status. Tasks can also be filtered at the document level, by section, by due date, etc. Tasks can also be filtered by their status. For example, a user can request to see only the user’s “in progress” tasks, while not showing tasks which the user has not yet started. As also shown in FIG. 3A, the user application interface, in this view shown in FIG. 3B, also has action buttons 306, which permit the user to immediately launch the document in the chosen word processing software to which the task is related.

Turning now to FIG. 4, a detail view of the user application is shown, which may be launched via a user interface element in the user application that indicated a desire to display a detailed view. In this view, all sections of the document (e.g., the whole document) are listed in the left pane. As shown, a user interface indicator 402, which, in this example, is a box around the icon, indicates sections of the documents where the user has tasks and differences in appearance (e.g., color) denotes the status of those tasks. In the center pane of the view is the document in read-only form. This view can be of the full document or only the specific section selected in the left pane. In the right pane, a list of user tasks 404 associated with the selected document is shown. From this view, users can launch a more detailed view of a task, that allows its status and other task metadata to be editable. This view may be launched using buttons next to each task. The word processing application, with the document open can be launched using the word processor link 406 at the bottom of the screen.

Figure 5:
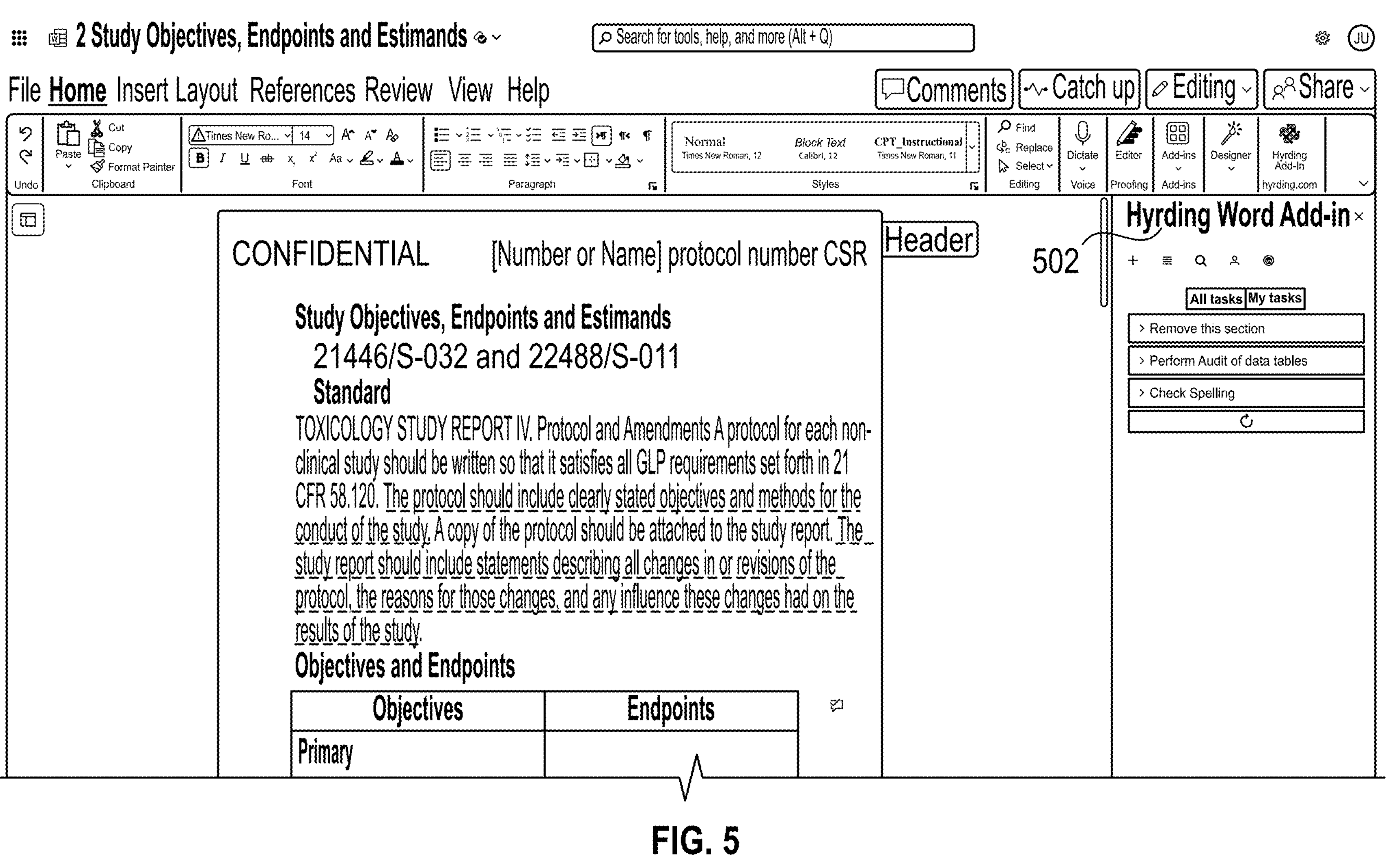
FIG. 5 is a user interface exemplar of a word processing application in accordance with one aspect of the present disclosure.

Turning now to FIG. 5, a view of a word processing application is shown. This view shows the view of the user interface for the word processor add-in functionality, as discussed above. In this word processor application view, the right pane shows in line task view 502. The association of the tasks with the document, in some embodiments stored as part of the document file itself, allows the task to be displayed in line with the document. In some embodiments, tasks can be associated with an induvial paragraph, sentence, or word of a document, so that a user can navigate to a task and be taken to the correct part of the document or document section where that work needs to be done.

Turning now to FIG. 6, a diagram of a system in accordance with one aspect of the present disclosure is shown. The system of FIG. 6 may be implemented in a network environment which may include a plurality of devices or systems configured to communicate over one or more network channels. For example, in various embodiments, the network environment may include, but is not limited to, a computing device, a web server, a cloud-based engine including one or more processing devices, a database, and/or one or more user computing devices operatively coupled over a network. The computing devices may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network.

In some embodiments, each of the processing device(s) may be a computer, a workstation, a laptop, a server such as a cloud-based server, or any other suitable device. In some embodiments, each of the processing devices is a server that includes one or more processing units, such as one or more graphical processing units (GPUs), one or more central processing units (CPUs), and/or one or more processing cores. Each processing device may, in some embodiments, execute one or more virtual machines. In some embodiments, processing resources (e.g., capabilities) of the one or more processing devices are offered as a cloud-based service (e.g., cloud computing). For example, a cloud-based engine may offer computing and storage resources of the one or more processing devices to other computing devices.

In some embodiments, the user computing devices may be a cellular phone, a smart phone, a tablet, a personal assistant device, a voice assistant device, a digital assistant, a laptop, a computer, or any other suitable device. In some embodiments, the server hosts one or more network environments. In some embodiments, the computing devices are operated by a network environment provider, and the user computing devices are operated by users of the network environment. In some embodiments, the processing devices are operated by a third party (e.g., a cloud-computing provider).

It will further be appreciated that additional systems, servers, storage mechanism, etc. may be included within the network environment. In addition, although embodiments are illustrated herein having individual, discrete systems, it will be appreciated that, in some embodiments, one or more systems may be combined into a single logical and/or physical system. For example, in various embodiments, different functionalities may be provided by a single logical and/or physical system. Similarly, although embodiments are illustrated having a single instance of each device or system, it will be appreciated that additional instances of a device may be implemented within the network environment. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

User computing devices may communicate over the communication network. For example, user computing devices may be operable to view, access, and interact with a website. A server may transmit user session data related to a user’s activity (e.g., interactions) on the website. For example, a user may operate a user computing device to initiate a web browser that is directed to the website hosted by the web server. The user may, via the web browser, perform various operations such as searching one or more databases or catalogs associated with the displayed website, view data for elements associated with and displayed on the website, and click on interface elements presented via the website. The website may capture these activities as user session data and transmit the user session data to the message classification computing device over the communication network. The website may also allow the user to interact with one or more of interface elements to perform specific operations, such as selecting one or more elements for further processing.

FIG. 6 provides a detailed overview of the system architecture of a system 600 with internal components here, that also communicates with external components as herein described. The integration of various containers, such as the Plugin 602, Bot 606, and Core Automation 608, are shown. Word processor add-in 602 interacts directly with word processing software and collaboration such as Microsoft Office 604, facilitating document and section file management within creative applications word processor and presentation editors such as Word or PowerPoint, collaborative applications such as Teams, and storage applications such as SharePoint. Word processor add-in 602 may permit an application user 620 or an external writer 622 to work with tasks in document sections. Word processor add-in 602 may also create data, e.g., metadata, for tasks to be saved in Microsoft office 604. Word processor add-in 602 may also make workflow calls to core automation 608.

Bot 606 manages automated tasks and interactions, enhancing the efficiency of processes through the system. Application user 620 may work with tasks, document functions, projects, and user administration via bot 606. Bot 606 may also act as an intermediary that communicates search requests from the Core Automation 608 to search databases and returns the search results back to the Core Automation. As discussed herein, document creators may search for supporting materials, including materials with the organizational library. Bot 606 may act as the initiator for various triggers within the system, managing the flow of information and initiating actions based on user inputs or predefined conditions.

Core automation 608 handles core logic and processes, ensuring that operations across the system are streamlined and efficient. Core automation 608 may also initiate search queries and manage team creation and deletion. Core automation 608 may also sends search requests to a search manager and may then receive search results to facilitate further actions. In some aspects, core automation 608 sends a search query to a search manager, which then processes the query against indexed data, e.g., from SharePoint data sites. Once the search is performed, the search manager may then send the results back to the bot 606, which in turn delivers these results to core automation 608 for user presentation or further processing.

Core automation 608 may also handle high-level operations such as creating templates, forming teams for specific projects, and merging documents post-editing or review. Core automation 608 may also make application program interface ("API") calls to Microsoft Office 604, and to core functions 610. Core automation 608 may also function as a central control unit for task management. Core automation 608 may handle operations such as task creation, deletion, and team management.

Core functions 610 may be implemented via Microsoft Azure. Core functions 610 may include functions for splitting the document into sections while also maintaining an updated version of the full document, as discussed herein. Core functions 610 may include a parser, which breaks down documents into manageable sections or extracts specific data, a cutter, which removes or segregates sections of documents for specific processing or isolated review, and a merger, which combines document sections back into a cohesive whole after edits or approval processes are complete.

The parser and cutter functions may be included in a split algorithm, which may rely on metadata stored in tables within Dataverse to guide the splitting process. This metadata may include on where the original files are located and the specific sections to be created based on the Table of Contents (TOC) data. By referencing this metadata, the algorithm accurately identifies the start and end points for each section and ensures that the content is extracted and saved correctly. The file metadata is not stored in Dataverse and contains details about the headers, footers, and formatting requirements for each section, enabling the algorithm to maintain consistency and integrity across the newly created documents. This approach ensures a structured and efficient splitting process, tailored to the unique specifications of each document.

Some embodiments of the split algorithm may be structured as follows.

1. Initialization and TOC Parsing
   - Load the DOCX file and identify the document.xml file.
   - Parse the Table of Contents (TOC) using the <w:fldSimple> tag with w:instr attribute "TOC".
   - Extract TOC entries represented by paragraphs (<w:p>) with hyperlinks (<w:hyperlink>).
2. Section Boundary Identification
   - Identify start points using the id attribute within <w:bookmarkStart> tags.
   - Determine end points by locating the subsequent <w:bookmarkStart> or the end of the document.
3. Content Extraction
   - Extract content between identified start and end points, including text, images, tables, and other elements.
   - Ensure the extracted content maintains its original structure and formatting.
4. Header and Footer Preservation
   - Duplicate headers and footers stored in separate XML files (header1.xml, footer1.xml) in the word directory.
   - Ensure each new section retains the original document's headers and footers.
5. Formatting Retention
   - Copy style definitions from styles.xml to new section files to maintain visual consistency.
   - Preserve all formatting, including fonts, styles, colors, and paragraph settings.
6. Saving Sections as Separate Files
   - Save each extracted section, along with preserved headers, footers, and formatting, as a new DOCX file.
   - Name each new file based on the TOC entry for clarity and organization.

Accordingly, the split algorithm leverages specific XML tags and structures within the DOCX file to split a document into smaller sections while preserving headers, footers, and formatting. This ensures that the resultant documents maintain the integrity and appearance of the original document.

Core functions 610 may also make API calls to message bus 618. Message bus 618 may provide API calls to external systems such as task tracker 614 or cloud storage 616. Core Automation 608 may also read from and write to Data Storage 612, which stores data securely. Message Bus 618 serves as the communication hub within the system, facilitating message passing and event handling between different components.

Secrets Manager 624 is responsible for securely storing and managing sensitive information such as API keys, passwords, and certificates. This ensures that only authorized components and users can access these secrets, thereby enhancing the system's security.

Secrets Manager 624 interfaces with various components to provide secure access to sensitive data. For instance, Core Automation module 608 might retrieve API keys for accessing external services, ensuring these credentials are protected during the process.

Payment service 626 handles financial transactions, such as subscription payments, license management, and other monetary transactions. Payment service 626 interacts with external payment gateways and the system's billing module. It ensures that all payment-related information is securely processed and recorded, providing real-time updates to the Admin Dashboard regarding subscription statuses and payments.

Installer component 628 is responsible for deploying, updating, configuring and providing health checks for the system across different environments. Installer component 628 ensures that all necessary components are installed correctly and updated regularly. Installer 628 interfaces with the Admin Dashboard for configuration settings and secures sensitive information during the installation process, e.g., using a key vault. It also checks compatibility with Microsoft Office, Task Tracker, and other integrated services to ensure seamless integration.

Core automation 608 may send search queries to the bot 606, which then communicates with search manager 624. Search results may then be processed and sent back to Core automation 608 for user presentation. This interaction between core automation 608 and bot 606 is used to maintain high search efficiency and accuracy, ensuring users receive timely and relevant search results.

Core automation 608 may initiate document-related tasks such as template creation, section parsing, and document merging. Core functions 610 may handle the parsing, cutting, and merging processes, which may be initiated by core automation 608. Efficient integration of the automation functions, and the component that provides the functions themselves, is useful for managing large documents with multiple contributors, e.g., by reducing the risk of data loss or version conflicts.

Core automation 608 may also send asynchronous requests to core functions 610, which may allow continued operation while documents are processed in the background. Allowing continued operation during document processing ensures efficient handling of large volumes. Detailed error messages from core functions 610 enable quick troubleshooting and recovery, maintaining smooth operations. Core functions 610 may also automatically scale based on workload, ensuring consistent processing times even during peak usage. Monitoring, e.g., continuous monitoring, may be included in core functions 610, and may include detailed logs to identify and resolve performance issues.

Core automation 610 interacts with an event grid, which may be part of core functions 610. Core functions 610 and core automation 608 may integrate with message bus 618 to synchronize tasks between the present system and external task management systems 614, which may include Jira and Microsoft Planner. Interactions between these three components ensures that tasks, which may be stored in multiple locations as detailed herein, remain up to date. Tasks created or updated in system 600, e.g., via the word processing plug-in 602, are synchronized with external task systems, and vice versa. Regular polling and webhooks detect and propagate task changes in real-time, ensuring up-to-date synchronization. The system 600 uses algorithms to resolve conflicts between simultaneous updates, maintaining consistency across platforms. The system 600 also includes a central task database synchronizes with external systems, ensuring consistent task statuses across all platforms.

The system 600 integrates deeply with Microsoft Office 604 products (e.g., SharePoint, Teams, Word, PowerPoint), allowing users to manage documents and tasks within a familiar environment.

The system 600 may also integrate with cloud storage solutions 616 like Dropbox and Veeva Cloud to store documents securely. This ensures data accessibility and reliability across the system. The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations are chosen in order to best explain the principles underlying the claims and their practical applications, to thereby enable others skilled in the art to best use the implementations with various modifications as are suited to the particular uses contemplated.

What is claimed is:

1. A computer-implemented method of processing an electronic document file, comprising:

retrieving electronic document file information representing a document, the electronic document file information including table of contents metadata and document-formatting information;

processing the electronic document file information to identify the table of contents metadata, a plurality of tables of contents entries, and a plurality of section boundary markers corresponding to the plurality of table of contents entries;

generating section-file mapping data that maps the plurality of table of contents entries to a plurality of separate section files based on the identified plurality of section boundary markers;

generating, from the electronic document file information according to the section-file mapping data and the identified plurality of section boundary markers, the plurality of separate section files;

copying, into each of the plurality of separate section files, at least a portion of the table of contents metadata and at least a portion of the document-formatting information, the document-formatting information including header information, footer information, and style information, such that each separate section file preserves structure and formatting of a corresponding portion of the electronic document file;

storing the plurality of separate section files at one or more storage locations remote from a central database;

applying first access control data to a first separate section file of the plurality of separate section files to permit access by a first user account, and applying second access control data to a second separate section file of the plurality of separate section files to permit access by a second user account;

writing first edits received from a first user device directly to the first separate section file at the one or more storage locations remote from the central database, and writing second edits received from a second user device directly to the second separate section file at the one or more storage locations remote from the central database;

retrieving the plurality of separate section files associated with the electronic document file from the one or more storage locations remote from the central database; and supplying the retrieved plurality of separate section files to a merge function that generates a new electronic document file separate and distinct from the electronic document file by ordering and combining the retrieved plurality of separate section files according to the table of contents metadata while preserving the header information, footer information, and style information.

2. The method of claim 1 further comprising, in response to user input, assigning a task to the first user relating to the first of the plurality of separate section files;

storing a data structure indicating the task;

using the data structure, displaying information relating to the task, in a document editing window where the first of the plurality of separate section files is open for editing; and in response to user input, updating a field of the data structure, indicating a change to a status of the task.

3. The method of claim 2, wherein the data structure is stored in the first of the plurality of separate section files.

4. The method of claim 3, further comprising synchronizing the data structure with an external task management database, stored separately from the first of the plurality of separate section files.

5. The method of claim 2, wherein the task is associated with user selected text within the first of the plurality of separate section files.

6. The method of claim 5, further comprising, in response to user input interacting with displayed information relating to the task, via a client device, automatically changing a display of the window that includes the user selected text.

7. A computer-implemented method of processing channel-associated word processing files on a server system comprising at least one server, comprising:

creating, by the server system, a plurality of channels, each channel having a channel name;

associating, by the server system, an independent word processing file with each channel of the plurality of channels;

storing the independent word processing files at one or more storage locations remote from a central database;

storing authentication data associated with each independent word processing file;

authenticating a first user account based on the authentication data and applying first access control data to a first independent word processing file associated with a first channel to permit access by the first user account, and authenticating a second user account based on the authentication data and applying second access control data to a second independent word processing file associated with a second channel to permit access by the second user account;

receiving, from a first client interface remote from the central database, first channel content for the first channel and writing the first channel content directly to the first independent word processing file, and receiving, from a second client interface remote from the central database, second channel content for the second channel and writing the second channel content directly to the second independent word processing file;

automatically retrieving the independent word processing file associated with the plurality of channels from the one or more storage locations remote from the central database; and supplying the retrieved independent word processing files to a merge function that generates a new continuous document by ordering and combining content from the retrieved independent word processing files according to the channel names, wherein the new continuous document is displayed on a user interface organized based on the channel names and the content from the retrieved independent word processing files.

8. The method of claim 7 further comprising, on the server system:

allowing an authorized user to edit an independent word processing file;

automatically updating the continuous document in real time after the user edits contributes to the independent word processing file;

formatting a table of contents based on the channel names; and linking elements of the table of contents to the continuous document.

9. A system for processing an electronic document file, comprising:

one or more processors; and a memory storing instructions that, when executed by the one or more processors, cause the system to:

retrieve electronic document file information representing a document, the electronic document file information including table of contents metadata and document-formatting information;

process the electronic document file information to identify the table of contents metadata, a plurality of tables of contents entries, and a plurality of section boundary markers corresponding to the plurality of table of contents entries;

generate section-file mapping data that maps the plurality of table of contents entries to a plurality of separate section files based on the identified plurality of section boundary markers;

generate, from the electronic document file information according to the section-file mapping data and the identified plurality of section boundary markers, the plurality of separate section files;

copy, into each of the plurality of separate section files, at least a portion of the table of contents metadata and at least a portion of the document-formatting information, the document-formatting information including header information, footer information, and style information, such that each separate section file preserves structure and formatting of a corresponding portion of the electronic document file;

store the plurality of separate section files at one or more storage locations remote from a central database;

apply first access control data to a first separate section file of the plurality of separate section files to permit access by a first user account, and apply second access control data to a second separate section file of the plurality of separate section files to permit access by a second user account;

write first edits received from a first user device directly to the first separate section file at the one or more storage locations remote from the central database, and write second edits received from a second user device directly to the second separate section file at the one or more storage locations remote from the central database;

retrieve the plurality of separate section files associated with the electronic document file from the one or more storage locations remote from the central database; and supply the retrieved plurality of separate section files to a merge function that generates a new electronic document file separate and distinct from the electronic document file by ordering and combining the retrieved plurality of separate section files according to the table of contents metadata while preserving the header information, footer information, and style information.

10. The system of claim 9, the one or more processors being further configured to:

in response to user input, assign a task to the first user relating to the first of the plurality of separate section files;

store a data structure indicating the task;

using the data structure, display information relating to the task, in a document editing window where the first of the plurality of separate section files is open for editing; and in response to user input, update a field of the data structure, indicating a change to a status of the task.

11. The system of claim 10, wherein the data structure is stored in the first of the plurality of separate section files.

12. The system of claim 11, the one or more processors being further configured to synchronize the data structure with an external task management database, stored separately from the first of the plurality of separate section files.

13. The system of claim 10, wherein the task is associated with user selected text within the first of the plurality of separate section files.

14. The system of claim 13, the one or more processors being further configured to, in response to user input interacting with the displayed information relating to the task, via a client device, automatically change a display of the window that includes the user selected text.

15. A system for processing channel-associated word processing files, comprising:

one or more servers including one or more processors; and a memory storing instructions that, when executed by the one or more processors, cause the one or more servers to:

create a plurality of channels, each channel having a channel name;

associate an independent word processing file with each channel of the plurality of channels;

store the independent word processing files at one or more storage locations remote from a central database;

store authentication data associated with each independent word processing file;

authenticate a first user account based on the authentication data and apply first access control data to a first independent word processing file associated with a first channel to permit access by the first user account, and authenticate a second user account based on the authentication data and apply second access control data to a second independent word processing file associated with a second channel to permit access by the second user account;

receive, from a first client interface remote from the central database, first channel content for the first channel and write the first channel content directly to the first independent word processing file, and receive, from a second client interface remote from the central database, second channel content for the second channel and write the second channel content directly to the second independent word processing file;

automatically retrieve the independent word processing file associated with the plurality of channels from the one or more storage locations remote from the central database; and supply the retrieved independent word processing files to a merge function that generates a new continuous document by ordering and combining content from the retrieved independent word processing files according to the channel names, wherein the new continuous document is configured to be displayed on a user interface organized based on the channel names and the content from the retrieved independent word processing files.

16. The system of claim 15 the one or more processors being further configured to, on the server system:

allow an authorized user to edit an independent word processing file;

automatically update the continuous document in real time after the user contributes to the independent word processing file;

format a table of contents based on the channel names; and link elements of the table of contents to the continuous document.

* * * * *